June 1, 1926.

T. E. MURRAY, JR 1,586,691

WELDING

Filed Feb. 6, 1923

INVENTOR
Thomas E. Murray Jr
BY
Anthony Usina
ATTORNEY

June 1, 1926.

T. E. MURRAY, JR 1,586,691

WELDING

Filed Feb. 6, 1923

INVENTOR
*Thomas E. Murray, Jr.*
BY
*D. Anthony Usina* ATTORNEY

Patented June 1, 1926.

1,586,691

UNITED STATES PATENT OFFICE.

THOMAS E. MURRAY, JR., OF BROOKLYN, NEW YORK.

WELDING.

Application filed February 6, 1923. Serial No. 617,410.

In the welding of drop forgings and other parts which are of different thicknesses at different points in the joint, considerable difficulties are encountered in securing a joint of uniform reliability at all points. This is particularly true in welding together segments or parts for the making of tubular products of varying thicknesses. There are other cases in which it is advantageous to vary the welding effect at different points in the length of the joint. My invention aims to provide a convenient process of welding for the above classes of work and for various other operations.

The segments are placed edge to edge and are pressed together between electrodes and a welding current passed across the contacting edges. Where the contacting edges are of substantially uniform thickness throughout their length and the segements are so shaped that these edges may be equidistant at all points from the electrodes, it is a simple matter to pass a uniform current through all points of the joint and to effect a good and uniform weld at all points. But where by reason of the shape of the pieces the current has to pass through a greater length of metal to reach some points in the contacting edges than others, or where such contacting edges are of different thicknesses at different points, it is difficult to secure a uniformly good weld throughout the joint. The thinner parts will be softened more quickly than the thicker parts and will be welded before the thicker parts. If the operation be continued long enough to secure the weld of the thicker parts, there is danger of burning the metal at the thinner parts. Similarly where one part of the joint is more remote from the point of contact with the electrode than some other part of the joint, so as to provide a longer path for the current, there is a corresponding variation in the welding effect.

These differences are particularly important in the method which I prefer to use for applying the current to work of this sort, namely the method described in my Reissue Patent No. 15,466 of October 10, 1922, in which a current of extremely high ampere strength per unit of area at the joint is applied for a very brief predetermined and regulated period of time.

I propose to avoid or at least to reduce considerably the difficulties described by bringing first one and then another point along the edges of the parts into contact during the welding operation. For this purpose the edges of the pieces to be united are so shaped that when the pieces are pressed together at the beginning of the operation only certain parts of their joint edges make contact. Then as the current is passed and the mechanical pressure is continued, the metal of the parts originally in contact is taken up and the remaining parts of the edges are brought together and receive their share of the current and the take-up is continued throughout the entire length of the joint until the end of the operation.

Figure 1:
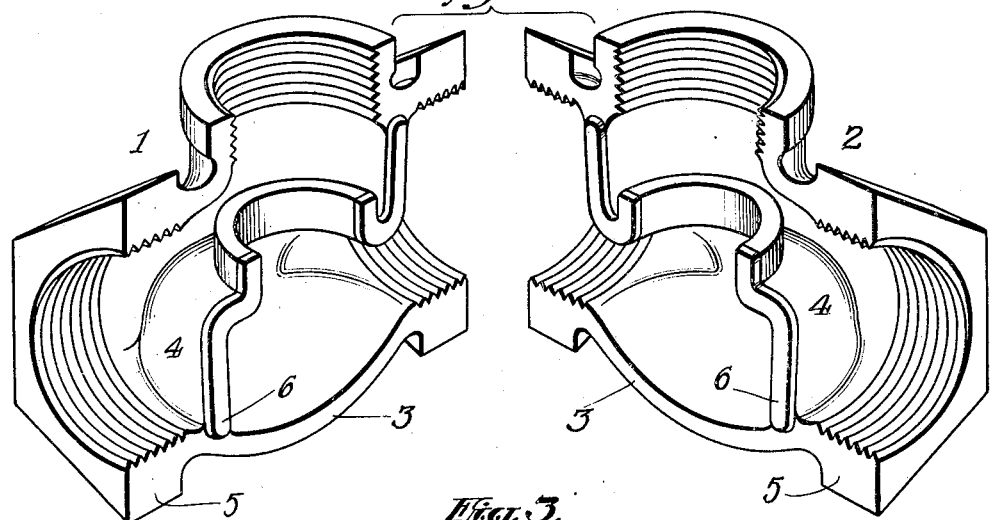
Fig. 1 shows in perspective two segments designed to be welded together for the making of a valve casing of the ordinary globe type.

For example in Fig. 1 there are two drop forgings 1 and 2 constituting practically halves of a globe valve casing divided longitudinally, with an outer shell 3 of the usual shape and an inside diaphragm 4 also of the usual shape. The diaphragm and the shell are of approximately equal thickness, the ends of the shell, however, being reinforced by flanges 5 of extra thickness.

In attempting to weld two such segments it has been found difficult to secure a good joint along the contact line of the diaphragm 4. The electrodes between which the parts are pressed together have to embrace the outsides of the two pieces. The current passes by a very short path to the edges of the outer casing, but by a considerably larger path to the edges of the diaphragm members 4. Consequently the outer shell would be provided with a better welded joint than the diaphragm.

To remedy this difficulty, according to my present invention, the diaphragm members 4 are provided with edge portions 6 which project beyond the edges of the shell proper by a slight distance so as to provide an increased take-up beyond that provided for the outer shell 3, 5.

Figure 2:
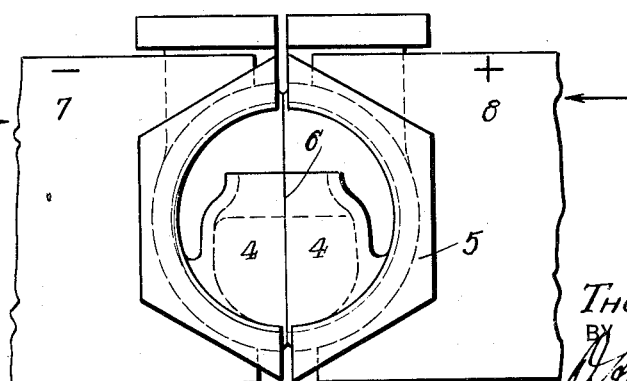
Fig. 2 illustrates the method of welding these two parts together.

Now when the pieces are brought together between electrodes 7 and 8, Fig. 2, the edges 6 of the diaphragm members 4 alone make contact. When the parts are pressed together and the current passed the surplus metal of the edges 6 is taken up until the edges of the outer shell 3 and 5 make contact, whereupon a second stage of the process commences, the current passing through all parts of the joint. This is continued through the determined time interval and for the required take-up of metal of the outer shell. That is in the first stage the only contact and the only take-up is for the metal of the diaphragm, and for the second stage the contact and take-up are throughout the entire joint.

The two stages of the operation may be applied to various parts of the work, depending upon the particular work at hand. For some cases the contact may be made in succession at more than two parts of the joint.

Figure 3:
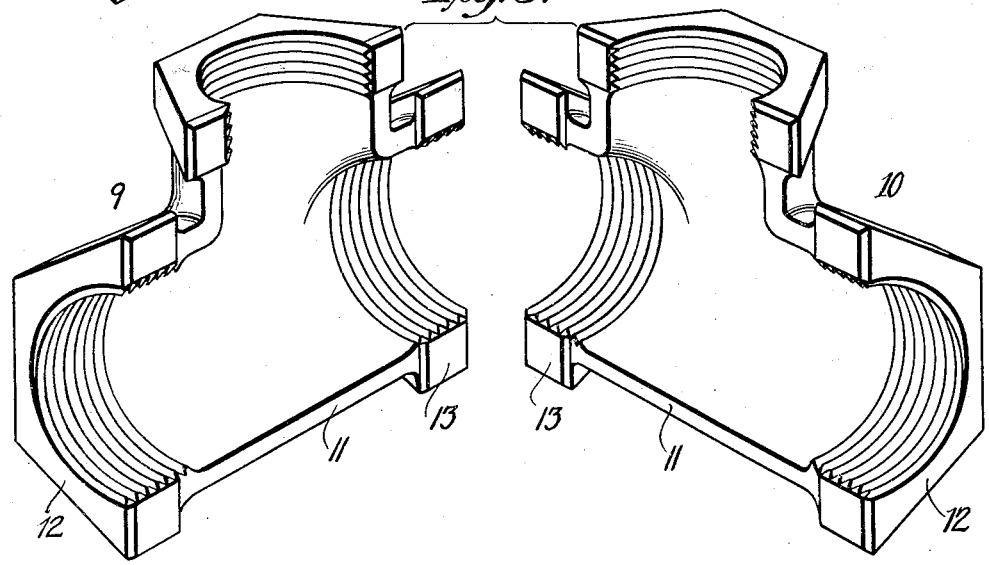
Fig. 3 is a perspective view of two parts of a T designed to be welded by this process.

In Fig. 3 there are two halves 9 and 10 of an ordinary tee having a thin shell 11 and thick flanges 12 at the ends. It is difficult to get a uniformly good joint for the comparatively thin shell 11 and the comparatively thick flange 12 if we make the operation of equal length for all parts. But by dividing the operation into two stages as described we can secure a more nearly uniform result. For this case we have illustrated the first stage of the weld as taking place between the thicker parts of the shell. These thickened flanges have their contacting edges or ends 13 projecting beyond the edges of the thinner part 11 of the shell. These extensions ensure that when the parts are pressed together between the electrodes the thicker portions of their edges will alone make contact at first; and after the current has passed and the pressure has moved the parts together sufficiently to take up their extra thickness there will be contact and a welding operation throughout the entire joint, the edges 11 as well as the edges 13, until the operation is completed.

In making the valve body described in connection with Fig. 1, the same expedient may be used of separating the welding operation of the parts 3 and 5 into successive stages, in addition to the separate stage for welding the edges 6.

In welding operations of the character described there is a certain amount of burr or flash formed of metal extruded at the joint and this, where smooth surfaces are desired, has to be removed by cutting, grinding or the like. The welding in successive stages described above may be applied with advantage to cases in which a burr, or an excessive burr, is more objectionable at one point than at another; and, in general, to cases in which the same degree of perfection in the weld is not required at all points of the joint.

Figure 4:
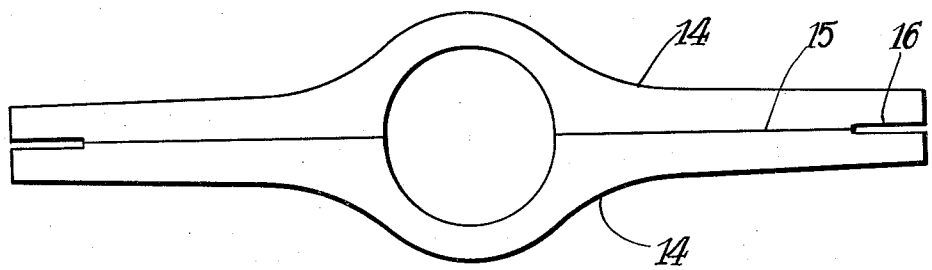
Fig. 4 is a side elevation of two segments in position to be welded together to form an axle housing.
Figure 5:
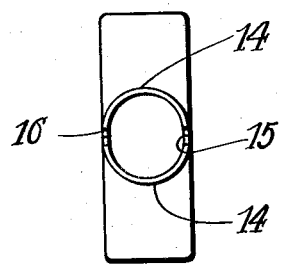
Fig. 5 is an end view of the same.

In Figs. 4 and 5 there are shown segments 14 from which an axle housing is to be formed by butt welding them along their contacting edges. Such axle housings have to be provided with fittings in the outer ends of the tubular portions. A burr, or an excessive burr, at the ends is, therefore, a disadvantage in that it makes the application of such fittings difficult, or requires an expensive and careful removal of the burr. I propose, therefore, to shape these segments so that the central portions will be welded first along the advanced lines 15, and the end portions later along the set back portions 16.

In this way the welding is accomplished with very little burr near the ends. Though the strength of the joint near the end is less than that in the middle, yet the strength of the complete joint is sufficient for the purpose.

Though I have described with great particularity of detail certain embodiments of my invention, yet it is not to be understood therefrom that the invention is restricted to the particular embodiments disclosed. Various modifications thereof may be made by those skilled in the art without departure from the invention as defined in the following claims.

What I claim is:—

1. The method of welding together parts with edges of different thicknesses at different points which consists in shaping the contact edges with projections at the thicker portions and pressing them together and passing a current to weld them first at the thicker portions and afterward at the thinner portions.

2. The method of producing tubular articles from segments thereof having edges of different thicknesses at different points, which consists in shaping such edges with projections at the thicker points and pressing them together and passing a current so as to weld them first at the thicker points and afterward at the thinner points.

3. The method of producing a valve casing with an internal diaphragm by welding together segments thereof which consists in shaping the edges of the segments with a projecting portion on the edges of the diaphragm, pressing the parts together and passing a welding current so as to weld them first along the diaphragm and afterwards along the outer shell.

4. The method of securing a welded joint between the edges of two parts with a reduced burr at one point in the length of the joint which consists in providing such parts with a minimum quantity of metal beyond the intended joint line at said point and with a greater quantity along the remainder of the joint and passing a welding current and pressing the parts together to take up a minimum quantity of metal at said point and a greater quantity along the rest of the joint.

In witness whereof, I have hereunto signed my name.

THOMAS E. MURRAY, Jr.